(12) United States Patent
Girtman

(10) Patent No.: US 10,119,642 B2
(45) Date of Patent: Nov. 6, 2018

(54) VACUUM COUPLING FOR ROBOT ARM

(71) Applicant: Intelligrated Headquarters, LLC, Mason, OH (US)

(72) Inventor: Michael Girtman, O'Fallon, MO (US)

(73) Assignee: Intelligrated Headquarters, LLC, Mason, OH (US)

( * ) Notice: Subject to any disclaimer, the term of this patent is extended or adjusted under 35 U.S.C. 154(b) by 1183 days.

(21) Appl. No.: 14/302,519

(22) Filed: Jun. 12, 2014

(65) Prior Publication Data

US 2014/0367962 A1 Dec. 18, 2014

Related U.S. Application Data

(60) Provisional application No. 61/835,374, filed on Jun. 14, 2013.

(51) Int. Cl.
*F16L 27/087* (2006.01)
*B25J 19/00* (2006.01)

(52) U.S. Cl.
CPC ......... *F16L 27/087* (2013.01); *B25J 19/0041* (2013.01)

(58) Field of Classification Search
CPC .................. B25J 19/0033; B25J 19/0041
USPC ............................................ 901/28, 40, 49
See application file for complete search history.

(56) References Cited

U.S. PATENT DOCUMENTS

| 4,683,912 A * | 8/1987 | Dubrosky ............ B25J 17/0241 137/580 |
| 5,515,599 A * | 5/1996 | Best ...................... B23Q 1/5481 29/38 C |
| 2002/0173242 A1* | 11/2002 | Wang ..................... B24B 37/30 451/41 |
| 2008/0003092 A1* | 1/2008 | Baclija ................. B25J 19/0029 414/752.1 |
| 2012/0319416 A1* | 12/2012 | Ellis ..................... B25J 15/0616 294/183 |
| 2014/0251056 A1* | 9/2014 | Preuss ..................... B25J 9/042 74/490.05 |

* cited by examiner

*Primary Examiner* — James M Hewitt, II
(74) *Attorney, Agent, or Firm* — Alston & Bird LLP

(57) ABSTRACT

A vacuum coupling applies vacuum from a vacuum source to a rotating tool attached to a rotating end of a robotic arm. The vacuum coupling includes a rotating portion attaching the rotating tool to the rotating end of the robotic arm. The rotating portion communicates vacuum with the rotating tool. A fixed portion is positioned around the rotating portion such that the rotating portion is rotatable relative to the fixed portion. The fixed portion communicates vacuum to the rotating portion. At least one rotating vacuum seal is positioned between the fixed portion and the rotating portion.

19 Claims, 4 Drawing Sheets

VACUUM COUPLING FOR ROBOT ARM

PRIORITY

This application claims priority to U.S. Provisional Patent Application Ser. No. 61/835,374, entitled "Vacuum Coupling for Robot Arm," filed on Jun. 14, 2013, the entire contents of which are incorporated by reference herein.

BACKGROUND

The present disclosure relates generally to robotic arms and is more particularly directed to a rotatable vacuum coupling for a tool attached to a robotic arm.

Robotic arms are components of high volume distribution and fulfillment operations to position articles for transit. Tool assemblies can be attached to an end of a robotic arm to manipulate articles. Frequently, these tools rotate relative to the robotic arm to manipulate and position articles. Flexible vacuum supply lines are typically used to feed vacuum to the rotating tool. One end of a vacuum supply line may be fixed, while the other end rotates with the tool. This can cause vacuum supply lines to bend up to 360 degrees or more and essentially wrap around the rotating tool. The flexible vacuum lines can be controlled during the wrapping to provide uniform line flexing and stressing, and constraints or guides can be used to prevent kinks and cracking. While vacuum lines are effective, sharp bends create large stresses and can lead to cracks, loss of vacuum, and machine downtime.

Consequently, a need exists for a vacuum coupling that can supply uninterrupted vacuum to a tool assembly without being wrapped around the tool as it rotates.

BRIEF DESCRIPTION OF THE FIGURES

The accompanying drawings, which are incorporated herein and constitute part of this specification, illustrate exemplary embodiments of the invention, and, together with the general description given above and the detailed description given below, serve to explain the principles of the present invention.

DETAILED DESCRIPTION

Figure 1:
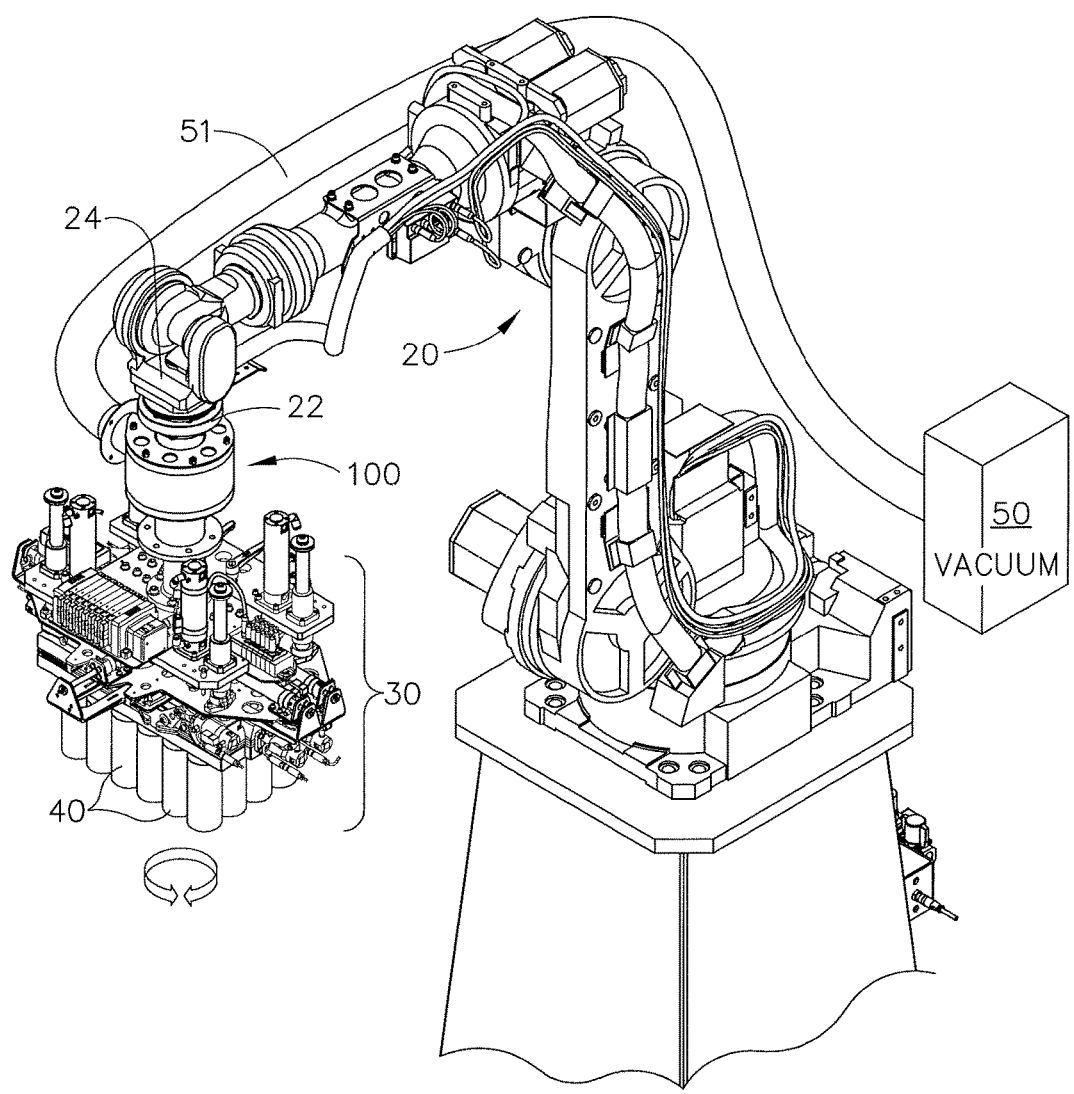
FIG. 1 illustrates an isometric view of a vacuum coupling that is positioned between a robotic arm and a vacuum tool assembly.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

The word "exemplary" is used herein to mean "serving as an example, instance, or illustration." Any implementation described herein as "exemplary" is not necessarily to be construed as preferred or advantageous over other implementations.

In one aspect of the innovation disclosed herein, a vacuum coupling applies vacuum from a vacuum source to a rotating tool attached to a rotating end of a robotic arm. The vacuum coupling comprises a rotating portion attaching the rotating tool to the rotating end of the robotic arm, such that the rotating portion and the rotating tool rotate in response to the rotation of the rotating end. The rotating portion is configured to communicate vacuum with the rotating tool. The vacuum coupling further comprises a fixed portion position around the rotating portion such that the rotating portion is rotatable relative to the fixed portion, with the fixed portion configured to communicate vacuum to the rotating portion. The vacuum portion further comprises at least one rotating vacuum seal between the fixed portion and the rotating portion.

Referring to the drawings, FIG. 1 illustrates vacuum coupling 100 positioned between robotic arm 20 and vacuum tool assembly 30. A portion of the vacuum tool assembly 30 is rotatably attached to rotating end 22 of robotic arm 20 and is shown holding a plurality of articles 40 with vacuum. Rotating end 22 of robot arm 20 can rotate the vacuum tool assembly 30 and the plurality of articles 40 three-hundred and sixty degrees or more as illustrated by arrows below vacuum tool assembly 30. Flexible vacuum hose 51 is attached along a side of robotic arm 20 and connects vacuum from vacuum supply 50 through vacuum coupling 100 and to vacuum tool assembly 30.

Figure 2:
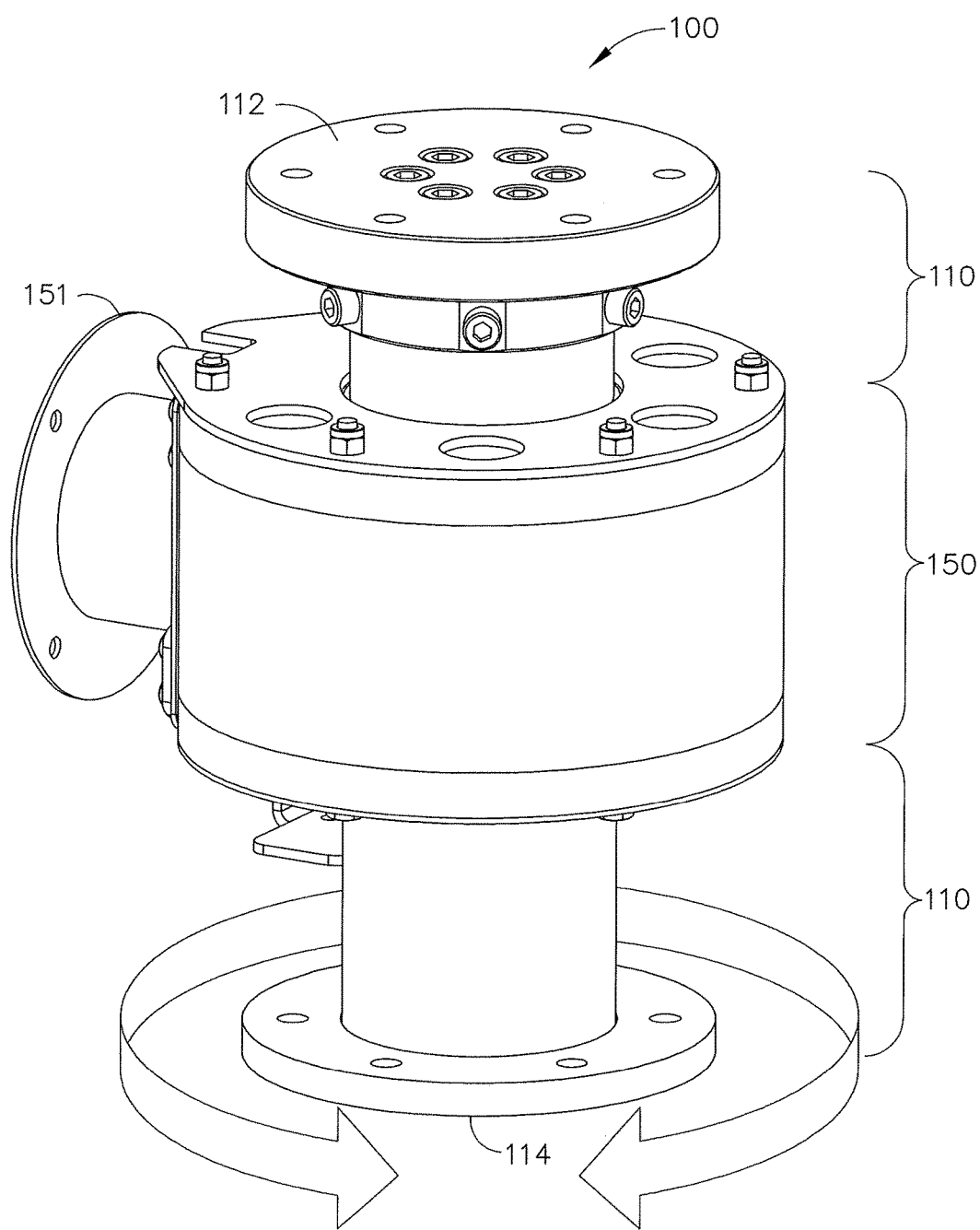
FIG. 2 illustrates an isometric view of the vacuum coupling of FIG. 1.

FIG. 2 shows vacuum coupling 100 in more detail. Vacuum coupling 100 includes rotating portion 110 and fixed portion 150. Rotating portion 110 extends through fixed portion 150 such that rotating portion 110 is rotatable relative to fixed portion 150. Rotating portion 110 thereby attaches vacuum tool assembly 30 to rotating end 22 of robotic arm 20 such that rotation of rotating end 22 results in rotation of vacuum tool assembly 30. Rotating portion 110 comprises first flange 112 that attaches to rotating end 22 of robot arm 20, and second flange 114 that attaches to vacuum tool assembly 30. Fixed portion 150 is fixed to second portion 24 of robot arm 20 and does not rotate with rotating end 22, rotating portion 110, or vacuum tool assembly 30. Fixed portion 150 comprises vacuum flange 151 that attaches to flexible vacuum hose 51 such that flexible vacuum hose 51 does not rotate.

Figure 3:
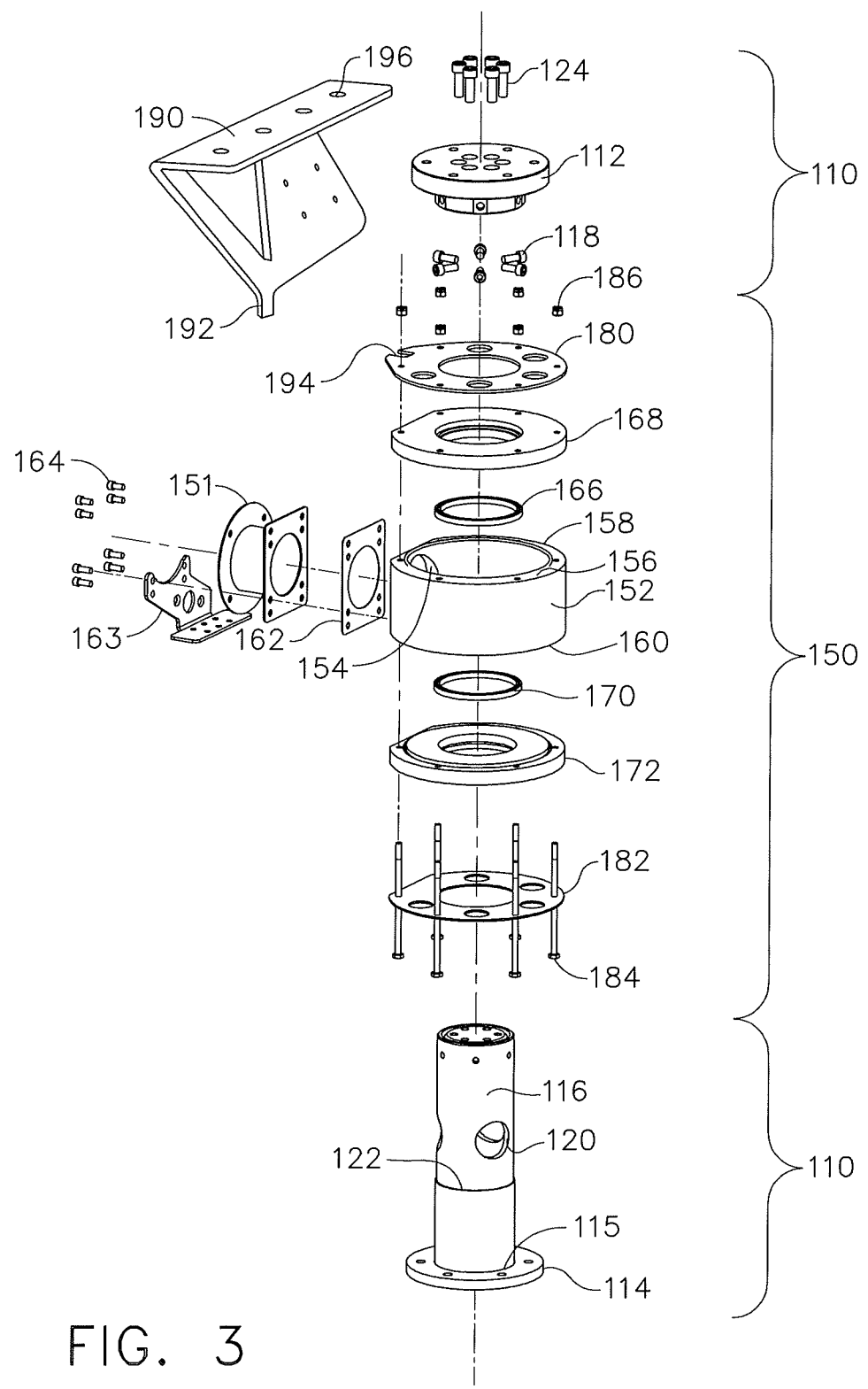
FIG. 3 illustrates an exploded view of the vacuum coupling of FIG. 2.

FIG. 3 is an exploded view of vacuum coupling 100. As shown, fixed portion 150 includes central manifold 152 defining port 154 extending through wall 156 thereof. Central manifold 152 is generally cylindrical and hollow, but other suitable configurations for central manifold 152 will be apparent to one with ordinary skill in the art in view of the teachings herein. First O-ring 158 mounts within a groove on a first end of wall 156, and second O-ring 160 mounts within a groove (not shown) on the opposing end of wall 156. Vacuum flange 151 attaches onto open port 154 positioned on a side of wall 156 of central manifold 152, and vacuum flange gasket 162 is secured therebetween by a plurality of vacuum bolts 164. Vacuum bolts 164 further secure cabling bracket 163 to an outside of the vacuum flange 151.

First annular vacuum seal 166 is retained within first manifold plate 168 and forms a fixed vacuum seal therewith. Second annular vacuum seal 170 is fixed within second manifold plate 172 and also forms a fixed vacuum seal therewith. First manifold plate 168 mounts on the first end of central manifold 152 and forms a vacuum seal with first O-ring 158. Second manifold plate 172 mounts on the opposing end of central manifold 152 and forms a vacuum seal with second O-ring 160. First clamp plate 180 mounts to first manifold plate 168 and second clamp plate 182 mounts to second manifold plate 172. A plurality of clamp bolts 184 extend through aligned openings within second clamp plate 182, second manifold plate 172, wall 156 of central manifold 152, first manifold plate 168, and first clamp plate 180. Clamp nuts 186 thread onto clamp bolts 184 and, when tightened, clamp second clamp plate 182, second manifold plate 172, wall 156 of central manifold 152, first manifold plate 168, and first clamp plate 180 together.

Figure 4:
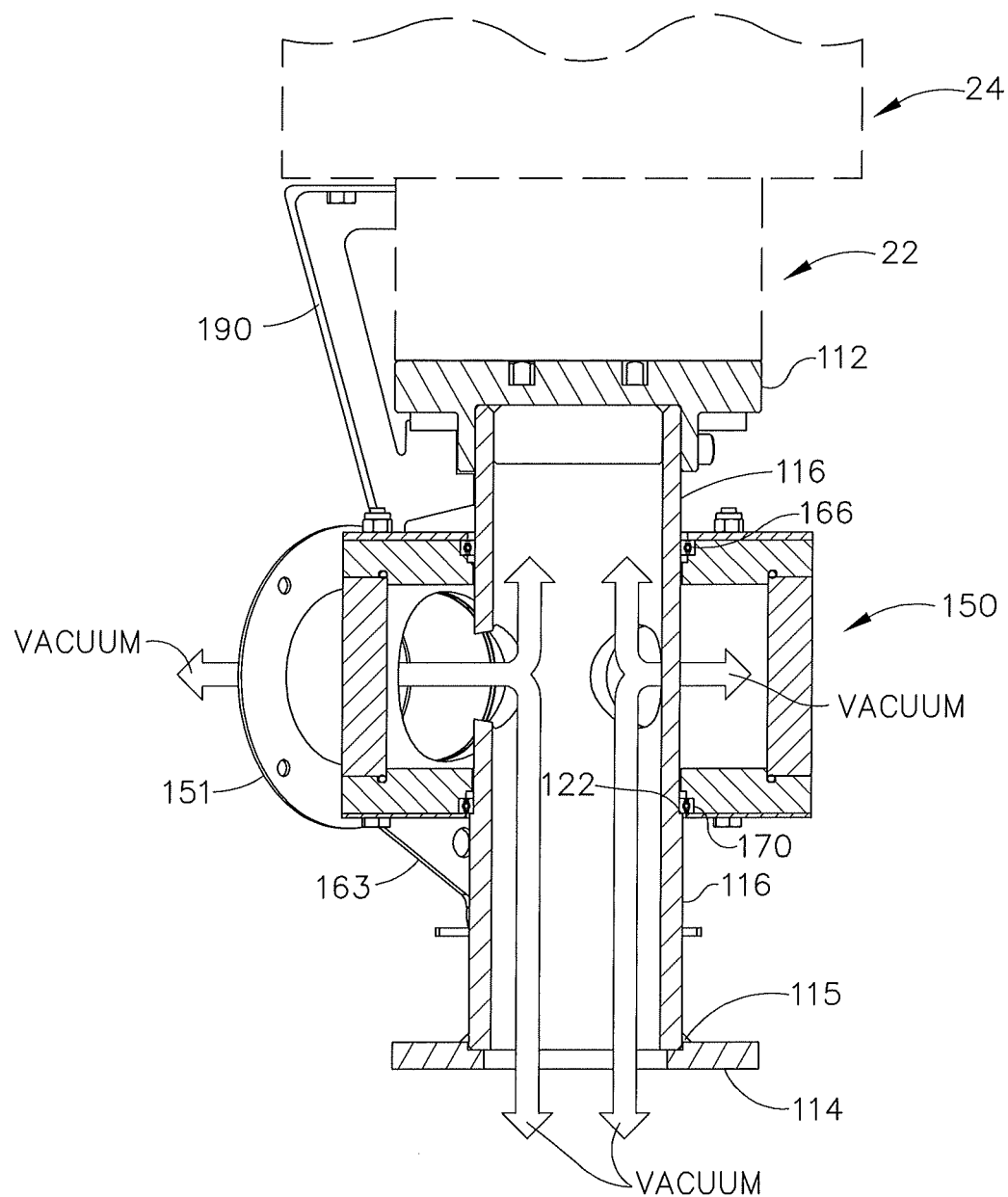
FIG. 4 illustrates a side section view of the vacuum coupling of FIG. 2.

Turning now to rotating portion 110, vacuum plenum 116 is fixed to the second flange 114 with a leak-proof joint such as weld 115 (see FIG. 4). Vacuum plenum 116 is hollow and of a generally cylindrical shape, but other configurations for vacuum plenum 116 will be apparent to one with ordinary skill in the art in view of the teachings herein. A plurality of vacuum orifices 120 pass through vacuum plenum 116, and step 122 is located between second flange 114 and the plurality of vacuum orifices 120. Vacuum plenum 116 is configured to pass through fixed portion 150 to form a rotating vacuum seal with both second annular vacuum seal 170 and first annular vacuum seal 166. Step 122 of vacuum plenum 116 is provided to contact second annular vacuum seal 170 and to prevent further egress therethrough. Step 122 thereby maintains the axial position of vacuum plenum 116 relative to fixed portion 150.

Once vacuum plenum 116 is inserted through fixed portion 150 and step 122 contacts second annular vacuum seal 170, first flange 112 can be attached to an end of vacuum plenum 116 to create a leak-proof seal therewith. A plurality of attachment bolts 118 can be applied in a radial orientation to secure first flange 112 to vacuum plenum 116. A plurality of bolts 124 can be used to couple first flange 112 with rotating end 22 of robotic arm 20. Anti-rotation bracket 190 attaches to an end portion of robot arm 20 adjacent to rotating end 22 through a plurality of bolt holes 196. Finger 192 extends outwardly from anti-rotation bracket 190 and is configured to slide into slot 194 of first clamp plate 180 to prevent rotation of fixed portion 150.

Turning now to FIG. 4, a cross sectional view of vacuum coupling 100 is shown. Rotating portion 110 of vacuum coupling 100 is coupled to both rotating end 22 of robotic arm 20 and vacuum tool assembly 30. For instance, first flange 112 is attached to rotating end 22 of robotic arm 20, while second flange 114 can be attached to vacuum tool assembly 30. Rotating portion 110 extends through fixed portion 150 and is rotatable relative to fixed portion 150. Vacuum flange 151 of fixed portion 150 is coupled with vacuum via flexible vacuum hose 51. Anti-rotation bracket 190 attaches fixed portion 150 to second portion 24 of robot arm 20. Because second portion 24 of robot arm 20 does not rotate, anti-rotation bracket 190 prevents fixed portion 150 from rotating.

Fixed portion 150 forms a vacuum chamber around rotating portion 110. Arrows are provided to show the passage of vacuum from vacuum supply 50, through fixed portion 150, through vacuum orifices 120 of rotating portion 110, and towards vacuum tool assembly 30. First annular vacuum seal 166 is fixed within first manifold plate 168 and forms a fixed vacuum seal with first manifold plate 168 and a rotating vacuum seal with vacuum plenum 116. Second annular vacuum seal 170 is fixed within second manifold plate 172 and forms a fixed vacuum seal with second manifold plate 172 and a rotating vacuum seal with vacuum plenum 116. Accordingly, vacuum is communicated to rotating portion 110 through fixed portion 150 as rotating portion 110 rotates.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology had been used for the sake of clarity. To the extent that the term "includes" is used in either the detailed description or the claims, such term is intended to be inclusive in a manner similar to the term "comprising" as "comprising" is interpreted when employed as a transitional word in a claim. It is to be understood that each specific term includes all technical equivalents which operate in a similar manner to accomplish a similar purpose. It is intended that the scope of the invention be defined by the claims submitted herewith.

What is claimed is:

1. A vacuum coupling configured to apply vacuum from a vacuum source to a rotatable vacuum tool, the rotatable vacuum tool being attached to a rotatable end of a robotic arm, the vacuum coupling comprising:
   a fixed portion coupled with the vacuum source;
   a rotating portion extending through the fixed portion, wherein the rotating portion is rotatable relative to the fixed portion, wherein the rotating portion comprises a first end coupled with the rotating end of the robotic arm and a second end coupled with the rotatable vacuum tool; and
   at least one seal between the fixed portion and the rotating portion wherein the at least one seal comprises a fixed vacuum seal and a rotating vacuum seal, wherein one of the fixed vacuum seal and the rotating vacuum seal forms a seal with the fixed portion and the other of the fixed vacuum seal and the rotating vacuum seal forms a seal with the rotating portion.

2. The vacuum coupling of claim 1, wherein the rotating portion comprises a vacuum plenum passing through the fixed portion.

3. The vacuum coupling of claim 2, wherein a hollow of the vacuum plenum is operably connected to the rotatable vacuum tool.

4. The vacuum coupling of claim 2, wherein the vacuum plenum comprises a plurality of openings for communicating vacuum from the fixed portion to the hollow of the vacuum plenum and to the rotatable vacuum tool.

5. The vacuum coupling of claim 2, wherein the vacuum plenum comprises a step configured to maintain axial position of the rotating portion relative to the fixed portion.

6. The vacuum coupling of claim 1, wherein the rotating portion comprises a flange for coupling the rotating portion with the rotating end of the robotic arm.

7. The vacuum coupling of claim 1, wherein the rotating portion comprises a flange coupling the rotating portion with the rotating tool.

8. The vacuum coupling of claim 1, wherein the rotating portion comprises a first flange located at a first end of the rotating portion and a second flange located at an opposing end of the rotating portion from the first flange.

9. The vacuum coupling of claim 1, wherein the fixed portion is coupled with a first portion of the robotic arm that does not rotate.

10. The vacuum coupling of claim 9 further comprising a bracket for coupling the fixed portion with the first portion of the robotic arm.

11. The vacuum coupling of claim 1, wherein the fixed portion comprises a manifold defining an opening extending through the manifold.

12. The vacuum coupling of claim 11, wherein the rotating portion is positioned through the opening of the manifold.

13. The vacuum coupling of claim 11, wherein the manifold comprises a port coupled with a vacuum source.

14. The vacuum coupling of claim 13, wherein the port is positioned through a side wall of the manifold.

15. The vacuum coupling of claim 1, wherein the fixed portion comprises at least one annular vacuum seal positioned in contact with the rotating portion to form the at least one seal.

16. The vacuum coupling of claim 15, wherein the at least one annular vacuum seal comprises a first annular vacuum seal positioned at a first end of the fixed portion and a second annular vacuum seal positioned on an opposing end of the fixed portion.

17. The vacuum coupling of claim 15, wherein the fixed portion comprises at least one manifold plate retaining the at least one annular vacuum seal.

18. The vacuum coupling of claim 17, wherein the fixed portion comprises at least one clamp plate coupling the at least one manifold plate to the fixed portion.

19. The vacuum coupling of claim 1, wherein the fixed portion is fixed to a second portion of the robot arm with an anti-rotation bracket and does not rotate with the rotating end of the rotating portion of the robot arm.

\* \* \* \* \*